United States Patent Office
3,041,333
Patented June 26, 1962

3,041,333
SUBSTITUTED CYCLOPROPYLCARBOXYAMIDO
DERIVATIVES OF PENICILLANIC ACID
Alfred W. Chow, Merchantville, N.J., and Joseph Weinstock, Phoenixville, Pa., assignors to Smith Kline & French Laboratories, Philadelphia, Pa., a corporation of Pennsylvania
No Drawing. Filed May 11, 1960, Ser. No. 28,241
6 Claims. (Cl. 260—239.1)

This invention related to novel chemotherapeutic agents and to processes for their preparation. More specifically it pertains to valuable synthetic antibiotics which not only possess valuable antimicrobial activity, but also demonstrate improved physical and physiological properties.

In general the novel compounds of our invention may be represented by the following structural formula:

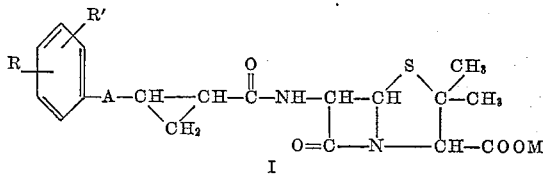

wherein R and R' represent hydrogen, halogen, lower alkoxy, lower alkyl, halogenated lower alkoxy, halogenated lower alkyl, amino, nitro, and hydroxy; A represents a periodic group VI atom of atomic weight less than 33; and M represents hydrogen or a pharmaceutically acceptable cation.

Representative of the groups embraced by the symbols R and R' are, in addition to hydrogen, halogen such as chloro, bromo, fluoro, and iodo; lower alkoxy such as methoxy, ethoxy, isopropoxy, butoxy and the like; lower alkyl such as methyl, ethyl, propyl, t-butyl, and the like; halogenated lower alkyl such as chloroethyl, trifluoromethyl and the like; halogenated lower alkoxy such as chloroethoxy and trifluoromethoxy; amino, including mono-lower alkyl amine, e.g. methylamine, di-lower alkylamino, e.g., dimethylamine, and the unsubstituted amino group; nitro; and hydroxy. The groups represented by R and R' may be the same or different.

The group M embraces hydrogen; i.e., the carboxylic acid function is present as the free acid, or pharmaceutically acceptable cations such as sodium ion, potassium ion or ammonium ion.

It is apparent from the above, that our novel compounds are 6-phenoxycyclopropanecarboxyamido derivatives and 6 - phenylthiocyclopropanecarboxyamido derivatives of penicillanic acid. We have discovered that compounds of this group possess antimicrobial activity similar to that demonstrated by the naturally occurring penicillins but in addition possess improved physical and physiological properties. These properties render these compounds as valuable therapeutic agents in the treatment of certain microbial infections. While retaining the beneficial antimicrobial activity of the naturally occurring penicillins, undesirable side effects are reduced or absent in these compounds.

The novel compounds of our invention are prepared by treating the appropriate 2-phenoxycyclopropanecarboxylic acid or 2-phenylthiocyclopropanecarboxylic acid with an alkyl chloroformate such as, for example, ethyl chloroformate so as to form the corresponding mixed anhydride. Subsequent treatment with 6-aminopenicillanic acid then yields the particular compound of this invention. These reactions may be summarized as follows:

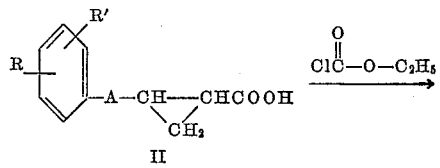

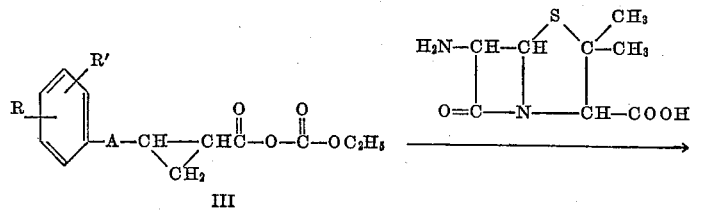

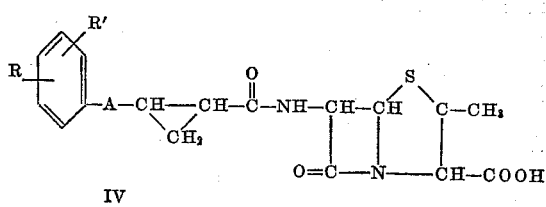

wherein A, R and R' are as above defined.

Several of the starting materials having Formula II are readily available. Those compounds which are unknown may be readily prepared by methods described in the literature and known to the art. Thus, for example, a thiophenol or phenol in which the desired R and R' groups are present is treated with ethylene chlorohydrin in the presence of potassium carbonate and potassium iodide so as to form the correspondingly substituted 2-phenylthioethanol or 2 phenoxyethanol. Acylation and pyrolysis of this product then yields the substituted pheny vinyl thioether or phenyl vinyl ether. Subsequent treatment of these vinyl ethers with ethyl diazoacetate readily yields the substituted phenylthiocyclopropane ethylcarboxylate or substituted phenoxycyclopropane ethylcarboxylate which upon basic hydrolysis gives the desired acid. These reactions may be summarized as follows:

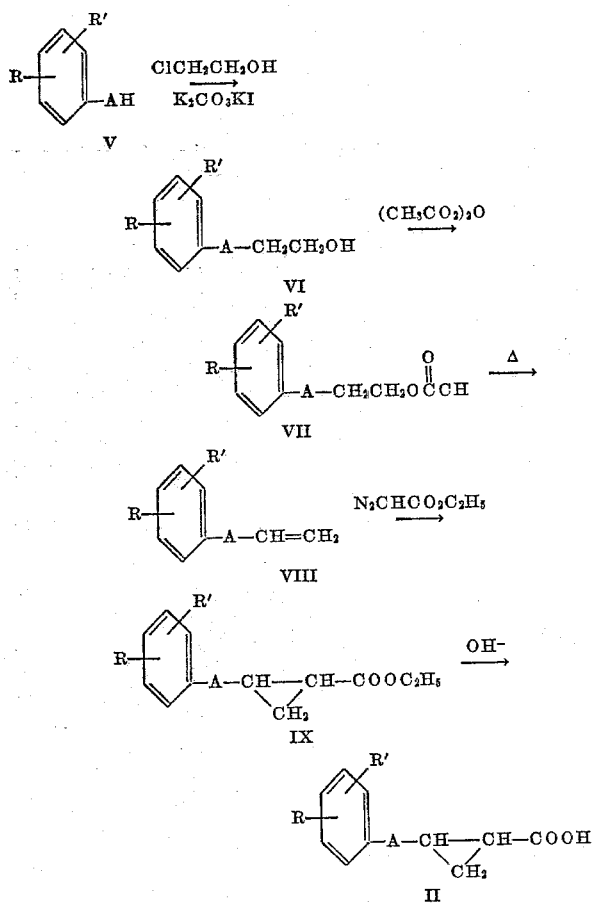

Where either or both of the groups R and R' represent amino, this group may be initially present or may be formed by reduction of the nitro group. Where particularly vigorous reactions are required, the amino group may be protected by methods well known and widely used in the art such as, for example, acylation.

It is apparent from the basic structure of our novel compounds that the configuration about the cyclopropane ring may be either cis or trans. Both forms are obtained upon formation of the cyclopropane group accordingly to the method herein employed and the respective forms may be separated by fractional distillation of the ethyl phenoxycyclopropanecarboxylate or ethyl phenylthiocyclopropanecarboxylate or alternatively by fractional crystallization of the corresponding free acids. Subsequent treatment according to the procedures herein recited results in formation of the cis and trans forms of the 6-phenoxycyclopropanecarboxyamido penicillanic acid and 6-phenylthiocyclopropanecarboxyamido penicillanic acid. Both forms exhibit antimicrobial activity and both are embraced within the scope of the present invention.

Also included within the scope of our invention are the pharmaceutically acceptable and chemically useful salts of our penicillanic acid derivatives. Such salts include for example in addition to the sodium, potassium and ammonium salts recited above, those salts of bases such as benethamine, procaine, hydrabamine, dibenzylethylenediamine and the like.

As discussed above, these compounds possess valuable antimicrobial properties and may be administered by any of the known pharmaceutical forms, as for example in forms of tablets and capsules for oral administration, creams and ointments for topical application, or solutions and suspensions for injectable or various topical applications.

The following examples will serve to further typify our invention. These examples however should not be construed as limiting the scope of this invention, the scope being defined only by the appended claims.

Example 1

A solution of 15.3 g. (0.086 M) of 2-phenoxycyclopropanecarboxylic acid in 200 ml. of acetone is cooled in an ice-salt bath to 0° C. To the cooled solution is added 10.2 g. (0.1 M) of triethylamine in 100 ml. of acetone. The temperature of the reaction mixture is maintained at 0° C. and a solution of 12.5 g. (0.11 M) of ethyl chloroformate in 45 ml. of acetone is added in a dropwise fashion with agitation. The resultant mixture is stirred for 30 minutes and allowed to gradually reach room temperature after which time it is filtered. The filtrate thus obtained is added slowly to a stirred solution of 23.8 g. (0.1 M) of 6-aminopenicillanic acid in 900 ml. of 3% aqueous sodium bicarbonate solution and 500 ml. of acetone. Upon completion of the addition, the mixture is allowed to attain room temperature while stirring is continued and the solution then stirred for an additional one-half hour. The mixture is then extracted with three portions of 300 ml. of ether and the resulting aqueous solution adjusted to pH 2.0 with 6 N sulfuric acid while maintaining a temperature of less than 10° C. Upon reaching pH 2.0, the solution is extracted immediately with 250 ml. of butyl acetate followed by two additional extractions of 75 ml. each of butyl acetate.

To the combined butyl acetate extracts are added 250 ml. of water and the pH adjusted to 8.0 by the addition of solid potassium bicarbonate with agitation. The layers are separated and the aqueous layer is adjusted to pH 2.0 by the addition of 6 N sulfuric acid at less than 10° C. This acidic aqueous mixture is next extracted with 200 ml. of butyl acetate and this organic extract then washed once with water and dried over sodium sulfate. The dried solution is then reduced in vacuo to a small volume and a 30% solution of potassium α-ethylhexanoate in isopropanol is added slowly until crystallization occurs. The crystals are then collected by centrifugation, washed with a small amount of acetone and dried. The dried crystals are recrystallized from butanol and dried to yield 6-(2-phenoxycyclopropanecarboxyamido)-penicillanic acid as the potassium salt.

Treatment of the potassium salt with hydrogen chloride and extraction with ether then yields the free acid, 6-(2-phenoxycyclopropanecarboxyamido)-penicillanic acid.

Example 2

By substituting an equivalent molar quantity of 2-(4-bromophenoxy)-cyclopropanecarboxylic acid for 2-phenoxycyclopropanecarboxylic acid in the procedure of Example 1 there is obtained upon purification in the prescribed manner, 6-[2-(4-bromophenoxy)-cyclopropanecarboxyamido]-penicillanic acid.

In a similar fashion the following halogenated phenoxycyclopropanecarboxylic acids are employed as starting materials in the procedure of Example 1: 2-(2-chlorophenoxy)-cyclopropanecarboxylic acid, 2-(3-chlorophenoxy)-cyclopropanecarboxylic acid, 2-(4-chlorophenoxy)-cyclopropanecarboxylic acid, 2-(4-fluorophenoxy)-cyclopropanecarboxylic acid, 2-(4-iodophenoxy)-cyclopropanecarboxylic acid, 2-(2-4-dichlorophenoxy)-cyclopropanecarboxylic acid, 2-(2,4,6-trichlorophenoxy)-cyclopropanecarboxylic acid. There are thus obtained respectively upon purification in the described manner the following compounds. 6 - [2 - (2 - chlorophenoxy) - cyclopropanecarboxyamido]-penicillanic acid; 6-[2-(3-chlorophenoxy)-cyclopropanecarboxyamido]-penicillanic acid; 6-[2-(4-chlorophenoxy) - cyclopropanecarboxyamido] - penicillanic acid; 6-[2-(4-fluorophenoxy)-cyclopropanecarboxyamido]-penicillanic acid; 6-[2-(4-iodophenoxy)-cyclopropanecarboxyamido]-penicillanic acid; 6-[2-(2,4-dichlorophenoxy)-cyclopropanecarboxyamido]-penicillanic acid;

and 6-[2-(2,4,6-trichlorophenoxy)-cyclopropanecarboxy]-penicillanic acid.

Example 3

(A) A mixture of 81.1 g. of 4-trifluoromethylphenol, 69 g. of potassium carbonate, 83 g. of potassium iodide, 40.2 g. of ethylene chlorohydrin and 400 ml. of acetone is heated at reflux temperature for 24 hours. The mixture is cooled and sufficient water is added to dissolve the inorganic salts. The organic layer is removed and the aqueous phase is extracted with ether. The combined organic solutions are washed with 5% solution of sodium hydroxide and dried with anhydrous magnesium sulfate. The ether is removed and the residual yellow oil is distilled at reduced pressure to give colorless 2-(4-trifluoromethylphenoxy) ethanol.

A solution of 20.6 g. of 2-(4-trifluoromethylphenoxy) ethanol in 75 ml. of acetic anhydride is heated under reflux for two hours. The excess acetic anhydride is removed under reduced pressure and the residual oil is diluted with 200 ml. of water and the mixture is extracted with ether. The ether extracts are washed with with a saturated saline solution and then dried with anhydrous magnesium sulfate. The solvent is removed in vacuo and the residual 2-(4-trifluoromethylphenoxy) ethanol acetate is distilled under reduced pressure to yield the product as a colorless liquid.

A cylindrical column is packed with glass helices and the column is placed in a vertical position and heated to 460° C. while a slow stream of nitrogen is introduced. 2-(4-trifluoromethylphenoxy) ethanol acetate (24.8 g.) is slowly dropped through the column while maintaining an internal temperature of 460° C. The vapors are collected in a cooled flask equipped with an acetone-dry ice condenser. Upon completion of the ethanol acetate addition, the column is flushed with 5 ml. of anhydrous benzene. The total product collected in the flask is diluted with 200 ml. of water and the mixture is extracted with ether. The combined ether extracts are washed with 5% sodium carbonate solution and the ethereal solution is dried and evaporated at atmospheric pressure. To the oily residue is added 0.2 g. of 4-t-butylcatechol and distillation at reduced pressure gives 4-trifluoromethylphenyl vinyl ether as a colorless oil.

4-trifluoromethylphenyl vinyl ether (31.9 g.) and 35.0 g. of ethyl diazoacetate are mixed at 0° C. and the mixture is gradually heated to 150° C. The reaction is maintained at 150° C. for three hours and the mixture is then distilled under reduced pressure. The main fraction which consists of ethyl 2-(4-trifluoromethylphenoxy)-cyclopropanecarboxylate is collected.

A solution of 11.5 g. of potassium hydroxide in 12 ml. of water and 50 ml. of 95% ethanol is added to 17.6 g. of ethyl 2-(4-trifluoromethylphenoxy)-cyclopropanecarboxylate. The solution is refluxed for four hours. The solvents are removed in vacuo to give a solid residue. The residue is dissolved in water and the solution adjusted to pH 1 with concentrated hydrochloric acid to give a precipitate. The filtered solid is recrystallized from water to give 2-(4-trifluoromethylphenoxy)-cyclopropanecarboxylic acid.

(B) Eight grams of 2-(4-trifluoromethylphenoxy)-cyclopropanecarboxylic acid are dissolved in 100 ml. of acetone and the solution cooled to 0° C. There is then introduced 5 g. of triethylamine in 50 ml. of acetone while maintaining the temperature below 0° C. This mixture is agitated and to it is added 5.4 g. of ethylchloroformate in 25 ml. of acetone. After stirring this mixture at 0° C. for 30 minutes there is next added 11.9 g. of 6-aminopenicillanic acid in 500 ml. of 3% aqueous sodium bicarbonate solution and 300 ml. of acetone. The resultant solution is stirred for an additional 30 minutes and the reaction mixture is allowed to attain room temperature. At the end of this time the crude product is isolated according to the procedure of Example 1 and purified as therein described.

There is thus obtained the compound, 6-[2-(4-trifluoromethylphenoxy) - cyclopropanecarboxyamido] - penicillanic acid.

Example 4

(A) 2-methyl-5-isopropylphenyl vinyl ether (28.0 g.) and 35.0 g. of ethyl diazoacetate are mixed at 0° C. and the mixture is gradually heated to a temperature of 150° C. The reaction mixture is heated at a temperature of 150° C. for three hours and the mixture is then distilled under reduced pressure. The main fraction consisting essentially of ethyl 2-(2-methyl-5-isopropylphenoxy)-cyclopropane carboxylate is collected and 16.2 g. of this compound are combined with a solution of 11.5 g. of potassium hydroxide in 12 ml. of water and 50 ml. of 95% ethanol. The mixture is refluxed for four hours and the solvents then removed in vacuo to give a solid residue. This residue is dissolved in water and the solution adjusted to pH 1 by addition of concentrated hydrochloric acid. The precipitates which forms is collected by filtration and recrystallized from water to yield 2-(2-methyl-5-isopropylphenoxy)-cyclopropanecarboxylic acid.

(B) A solution of 15 g. of 2-(2-methyl-5-isopropylphenoxy)-cyclopropanecarboxylic acid in 200 ml. of acetone is subjected to the reaction procedure of Example 1 and upon purification in the manner therein described there is formed 6-[2-(2-methyl-5-isopropylphenoxy)-cyclopropanecarboxyamido]-penicillanic acid.

Example 5

2-(4-methylphenoxy)-cyclopropanecarboxylic (13.1 g.) acid is substituted for 2-phenoxycyclopropanecarboxylic acid in the procedure of Example 1. Purification in the prescribed manner then yields 6-[2-(4-methylphenoxy)-cyclopropanecarboxyamido]-penicillanic acid.

Example 6

By employing 13.3 g. of 2-(4-methoxyphenoxy)-cyclopropanecarboxylic acid in place of 2-phenoxycyclopropanecarboxylic acid in the procedure of Example 1, there is obtained upon purification in the manner therein described the compound, 6-[2-(4-methoxyphenoxy)-cyclopropanecarboxyamido]-penicillanic acid.

Example 7

2-(4-nitrophenoxy)-cyclopropanecarboxylic acid (15 g.) is substituted for 2-phenoxycyclopropanecarboxylic acid in the procedure of Example 1. There is obtained upon purification in the manner therein described the compound 6 - [2 - (4 - nitrophenoxy) - cyclopropanecarboxyamido]-penicillanic acid.

Example 8

Five grams of potassium 6-[2-(4-nitrophenoxy)-cyclopropanecarboxyamido]-penicillanic acid are placed in a stainless steel hydrogenation container. There are then introduced 2.5 g. of 5% palladium on carbon in 18 ml. of water followed by 128 ml. of isopropanol under nitrogen. The container is flushed with nitrogen and hydrogen is then introduced at an initiated pressure of about 30 lb./in.². The reaction is agitated for eight hours maintaining a temperature of approximately 25° C. by means of a water bath. At the end of this time, the container is flushed with nitrogen and 160 ml. of isopropanol are added. The resultant mixture is filtered and stored at 5° C. overnight. The solution is again filtered and filtrate reduced to a volume of approximately 60 ml. in vacuo. The solution is allowed to stand until crystals form. The solution is then filtered and the crystals so collected dried at 100° C. in vacuo. Recrystallization from butanol then yields potassium 6-[2-(4-aminophenoxy)-cyclopropanecarboxyamido]-penicillanic acid.

Example 9

Ten grams of 4-nitrophenyl vinyl ether in 160 ml. of absolute ethanol under nitrogen are hydrogenated in the presence of 5.0 g. of 5% palladium on carbon at a pressure of approximately 30 lb./in.² At the completion of the hydrogen uptake, the solution is flushed with nitrogen and the catalyst removed by filtration. Evaporation of the solution yields 4-aminophenyl vinyl ether.

Six grams of 4-aminophenyl vinyl ether are added to 60 ml. of water and 10 ml. of concentrated sulfuric acid at −10° C. The mixture is stirred while 3.4 g. of sodium nitrite in 20 ml. of water are added slowly.

There is prepared 80 ml. of a saturated solution of copper sulfate. Steam is passed through this solution and the diazonium salt prepared above is carefully added. When the addition is complete the mixture is cooled and extracted with ether. The ether extracts are washed with a small amount of water and dried over sodium sulfate. Concentration of the dried ethereal solution yields 4-hydroxyphenyl vinyl ether.

To 50 ml. of absolute ethanol is added 1.5 g. of freshly cut sodium metal. When the metal is completely dissolved, 7.8 g. of 4-hydroxyphenyl vinyl ether is added and the mixture well agitated. There is next introduced 7 g. of benzylchloride and the mixture is slowly warmed to about 50° C. At the end of this time 50 ml. of water are added and the layers separated. The aqueous phase is extracted once and the ether extracts combined with the organic layer. The solvent is removed under reduced pressure and the residue fractionally distilled, the largest fraction consisting of 4-benzyloxyphenyl vinyl ether.

4-benzyloxyphenyl vinyl ether (7.8 g.) and 7 g. of ethyldiazoacetate are mixed at 0° C. and the mixture slowly heated to 150° C. The reaction mixture is maintained at 150° C. for three hours and the mixture then distilled under reduced pressure. The main fraction consists of ethyl 2 - (4-benzyloxyphenoxy)-cyclopropanecarboxylate.

A solution of 2.9 g. of potassium hydroxide in 4 ml. of water and 13 ml. of 95% ethanol is added to 5.3 g. of ethyl 2 - (4-benzyloxyphenoxy)-cyclopropanecarboxylate. The solution is refluxed for 4 hours and the solvents removed in vacuo to leave a solid residue. The residue is dissolved in water and the solution adjusted to pH 1 by the addition of concentrated hydrochloric acid. The solid which forms is collected by filtration and recrystallized from water to give 2-(4-benzyloxyphenoxy)-cyclopropanecarboxylic acid.

Six grams of this compound, 2-(4-benzyloxyphenoxy)-cyclopropanecarboxylic acid are then subjected to the reaction procedure of Example 1 employing one-fourth the quantities therein recited. There is thus obtained, 6-[2-(4-benzyloxyphenoxy)-cyclopropanecarboxyamido] - penicillanic acid.

Five grams of 6 - [2-(4-benzyloxyphenoxy)-cyclopropanecarboxyamido]-penicillanic acid and 2.5 g. of 5% palladium on charcoal are added to 18 ml. of water and 125 ml. of isopropanol in a stainless steel hydrogenation apparatus and flushed with nitrogen. Hydrogen gas is introduced at an initial pressure of approximately 30 lbs./in.² and the container shaken for 5 hrs. at room temperature. The container is again flushed with nitrogen, 150 ml. of isopropanol are added and the catalyst removed by filtration. The filtrate is cooled at 0° C. for several hours and again filtered. The solution is then reduced in volume in vacuo to approximately 30 ml. and the solid thus formed collected by filtration. The solid is dried at 100° under reduced pressure and recrystallized from isobutanol to yield 6-[2-(4-hydroxyphenoxy)-cyclopropanecarboxyamido]-penicillanic acid.

Example 10

By following the procedure of Example 1 and employing 2-(2-methyl-4-chlorophenoxy)-cyclopropanecarboxylic acid (19.4 g.) as the starting material, there is obtained upon purification as therein described, 6-[2-(2-methyl-4-chlorophenoxy)-cyclopropanecarboxyamido] - penicillanic acid.

Example 11

2-(2-methoxy-4-chlorophenoxy) - cyclopropanecarboxylic acid (20.9 g.) is substituted for 2-phenoxycyclopropanecarboxylic acid in the procedure of Example 1. There is thus obtained upon purification the compound, 6 - [2 - (2-methoxy-4-chlorophenoxy)-cyclopropanecarboxyamido]-penicillanic acid.

Example 12

(A) 2-methylphenyl vinyl thioether (25.4 g.) and 35.0 g. of ethyl diazoacetate are mixed at 0° C. and the mixture gradually heated to 150° C. The temperature is maintained for 3 hours after which time the mixture is distilled under reduced pressure. The main fraction which is collected consists of ethyl 2-(2-methylphenylthio)-cyclopropanecarboxylate.

A solution of 11.5 g. of potassium hydroxide in 12 ml. of water and 50 ml. of ethanol is added to 15.2 g. of ethyl 2 - (2 - methylphenylthio)-cyclopropanecarboxylate and the solution refluxed for 4 hours. The solution is then reduced to a residue in vacuo and the solid thus obtained dissolved in water and the resultant solution adjusted to pH 1 by addition of concentrated hydrochloric acid. The solid which forms is collected by filtration to yield trans 2-(2-methylphenylthio)-cyclopropanecarboxylic acid. Concentration of the mother liquor to a residue yields cis 2-(2-methylphenylthio)-cyclopropanecarboxylic acid. These 2 forms may then be subjected separately to the following procedure to obtain the corresponding cis and trans derivatives of penicillanic acid.

(B) A solution of 17.9 g. of 2-(2-methylphenylthio)-cyclopropanecarboxylic acid in 200 ml. of acetone is cooled in an ice-salt bath to 0° C. To the solution is added 10.2 g. (0.1 M) of triethylamine in acetone (100 ml.). The temperature is maintained at 0° C. and 12.5 g. (0.11 M) of ethyl chloroformate in 45 ml. of acetone is added in a dropwise fashion with agitation. The resultant mixture is stirred for 30 minutes and allowed to warm gradually to room temperature after which time it is filtered. The filtrate is added slowly to a stirred solution of 23.8 g. of 6-amino-penicillanic acid in 900 ml. of 3% aqueous sodium bicarbonate solution and 500 ml. of acetone. Upon completion of the addition, the mixture is allowed to attain room temperature with stirring and then stirred for an additional one-half hour. The mixture is extracted three times with 300 ml. of ether and the resulting solution adjusted to pH 2.0 with 6 N sulfuric acid while maintaining a temperature less than 10° C. Upon reaching pH 2.0, the solution is extracted immediately with 250 ml. of butyl acetate followed by two extractions of 75 ml. each of butyl acetate. To the combined butyl acetate extracts are added to 250 ml. of water and the pH adjusted to 8.0 by the addition of solid potassium bicarbonate with agitation. The layers are separated and the aqueous layer is adjusted to pH 2.0 by the addition of 6 N sulfuric acid at <10° C. This acidic aqueous mixture is next extracted with 200 ml. of butyl acetate and this organic extract next washed once with water and dried over sodium sulfate. The dried solution is then reduced in vacuo to a small volume and a 30% solution of potassium α-ethylhexanoate in isopropanol is added slowly until crystallization occurs. The crystals are then collected by centrifugation, washed with a small amount of acetone and dried. The dried crystals are recrystallized from butanol and dried to yield 6-[2-(2-methylphenylthio)-cyclopropanecarboxylamido]-penicillanic acid as the potassium salt.

In a similar fashion by substituting 4-methylphenyl vinyl thioether for 2-methylphenyl thioether in Part A of this example and subsequently executing the reaction procedure of Part B of this example, there is obtained the compound, 6 - [2-(4-methylphenylthio)-cyclopropanecarboxyamido]-penicillanic acid as the potassium salt.

Example 13

3,4-dichlorophenyl vinyl thioether (34.8 g.) is substituted for 2-methylphenyl vinyl thioether is the procedure of Example 12 Part A and upon subsequent treatment according to the procedure of Part B of the product thus obtained there is yielded potassium 6-[2-(3,4-dichlorophenylthio)-cyclopropanecarboxyamido]-penicillanate.

Example 14

2-methyl-4-chlorophenyl vinyl thioether (31.2 g.) is subjected to the procedures of Example 12 and there is thus obtained upon purification the compound, 6-[2-(2-methyl-4-chlorophenylthio) - cyclopropanecarboxyamido] - penicillanic acid as the potassium salt.

Example 15

4-nitrophenylvinylthioether (30.6 g.) is employed in the procedures of Example 12 and there is thus obtained upon purification the compound 6-[2-(4-nitrophenylthio)-cyclopropanecarboxamido]-penicillanic acid.

Reduction of this compound according to the procedure of Example 8 yields the corresponding amino compound, 6-[2-(4-aminophenylthio) - cyclopropanecarboxyamido]-penicillanic acid as the potassium salt.

Example 16

By employing 2,5-dimethyl-4-chlorophenyl vinyl-thio-ether (37.2 g.) in place of 2-methylphenyl vinyl thioether in the procedure of Example 12, there is obtained upon completion of the steps recited therein, the compound, 6-[2-(2,5-dimethyl - 4 - chlorophenylthio) - cyclopropanecarboxyamido]-penicillanic acid as the potassium salt.

Example 17

To 1.8 l. of water and 300 ml. of concentrated sulfuric acid at −10° C. are added 236 g. of 4-trifluoromethoxy-aniline. The mixture is stirred while 102 g. of sodium nitrite in 600 ml. of water are added. Upon completion of addition, the diazonium salt solution is carefully added to 2.4 l. of a saturated aqueous solution of copper sulfate through which is passed a stream of steam. The mixture is then cooled and extracted with ether. The ethereal extracts are washed with water, dried over sodium sulfate, and concentrated to yield 4-trifluoromethoxyphenol.

4-trifluoromethoxyphenol (89 g.) is then subjected to the reaction procedure of Example 3, Parts A and B and upon isolation of the product as therein described, there is obtained 6-[2-(4-trifluoromethoxyphenoxy)-cyclopropanecarboxyamido]-penicillanic acid.

Example 18

One gram of 6-(2-phenoxycyclopropanecarboxyamido)-penicillanic acid is dissolved in excess amyl acetate and titrated with dilute sodium hydroxide to pH 8. The solution is then reduced in volume and the crystals which form are isolated by filtration to yield sodium 6-(2-phenoxycyclopropanecarboxyamido)-penicillanate.

Example 19

One gram of 6-[2-(4-chlorophenoxy)-cyclopropanecarboxyamido]-penicillanic acid is dissolved in excess amyl acetate and to the solution is added 10 g. of N-ethyl piperidine. The solution is stirred and the crystals formed upon standing are collected by filtration to yield the N-ethyl piperidinium salt of 6-[2-(4-chlorophenoxy)-cyclopropanecarboxyamido]-penicillanic acid.

We claim:

1. Compounds having the structural formula:

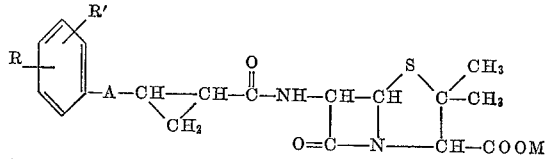

wherein M is a member of the group consisting of hydrogen and pharmaceutically acceptable cations, R and R' are members of the group consisting of hydrogen, halogen, lower alkyl, lower alkoxy, halogenated lower alkyl, halogenated lower alkoxy, hydroxy, nitro, and amino; and A is a periodic group VI atom of atomic weight less than 33.

2. 6-(2-phenoxycyclopropanecarboxyamido)-penicillanic acid.

3. 6-[2-(4 - chlorophenoxy) - cyclopropanecarboxyamido]-penicillanic acid.

4. 6-[2-(4-methoxyphenoxy)-cyclopropanecarboxyamido]-penicillanic acid.

5. 6-[2-(4-aminophenoxy) - cyclopropanecarboxyamido]-penicillanic acid.

6. 6-[2 - (3,4 - dichlorophenylthio) - cyclopropanecarboxyamido]-penicillanic acid.

References Cited in the file of this patent
UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,941,995 | Doyle et al. | June 21, 1960 |
| 2,985,648 | Doyle et al. | May 23, 1961 |

FOREIGN PATENTS

| | | |
|---|---|---|
| 569,728 | Belgium | Nov. 15, 1958 |

OTHER REFERENCES

Evers et al.: The Chemistry of Drugs, pp. 317–22, 3rd ed. (1959).